March 17, 1964     C. V. TILDEN     3,125,172
PORTABLE DRILLING APPARATUS
Filed Sept. 8, 1959     3 Sheets-Sheet 1
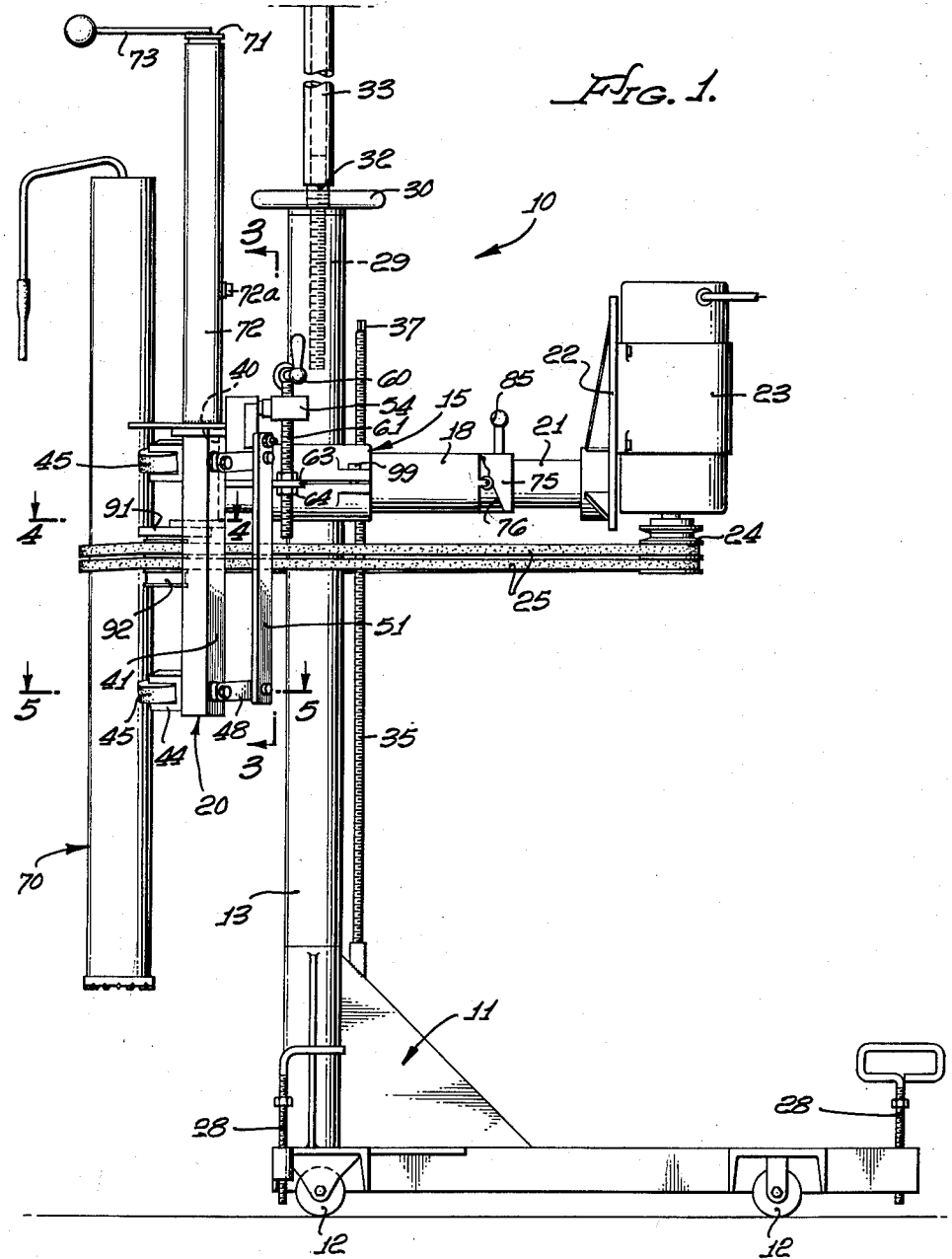
INVENTOR.
CARL V. TILDEN
BY
ATTORNEY.

March 17, 1964 C. V. TILDEN 3,125,172
PORTABLE DRILLING APPARATUS
Filed Sept. 8, 1959 3 Sheets-Sheet 2
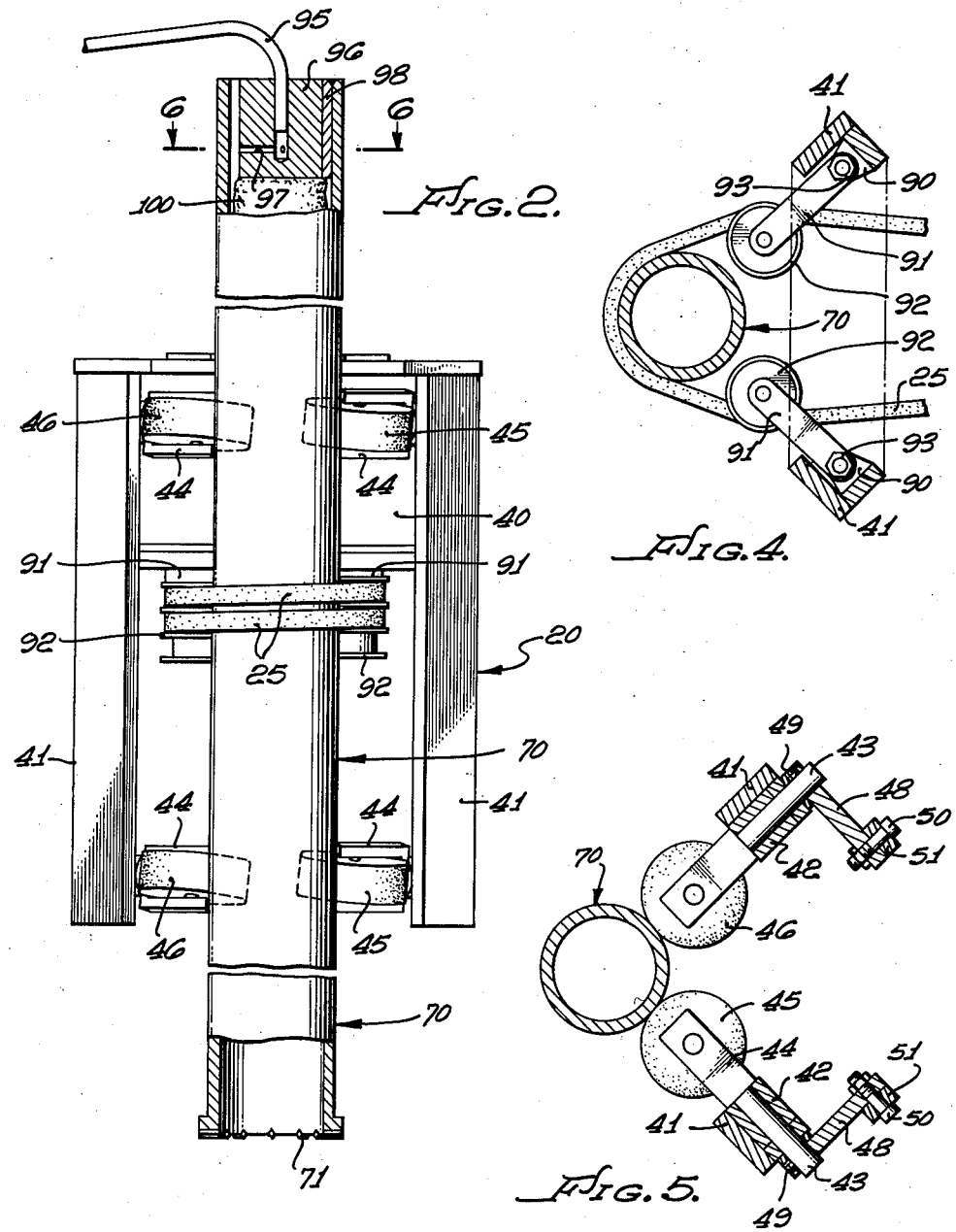
INVENTOR.
CARL V. TILDEN
BY
ATTORNEY.

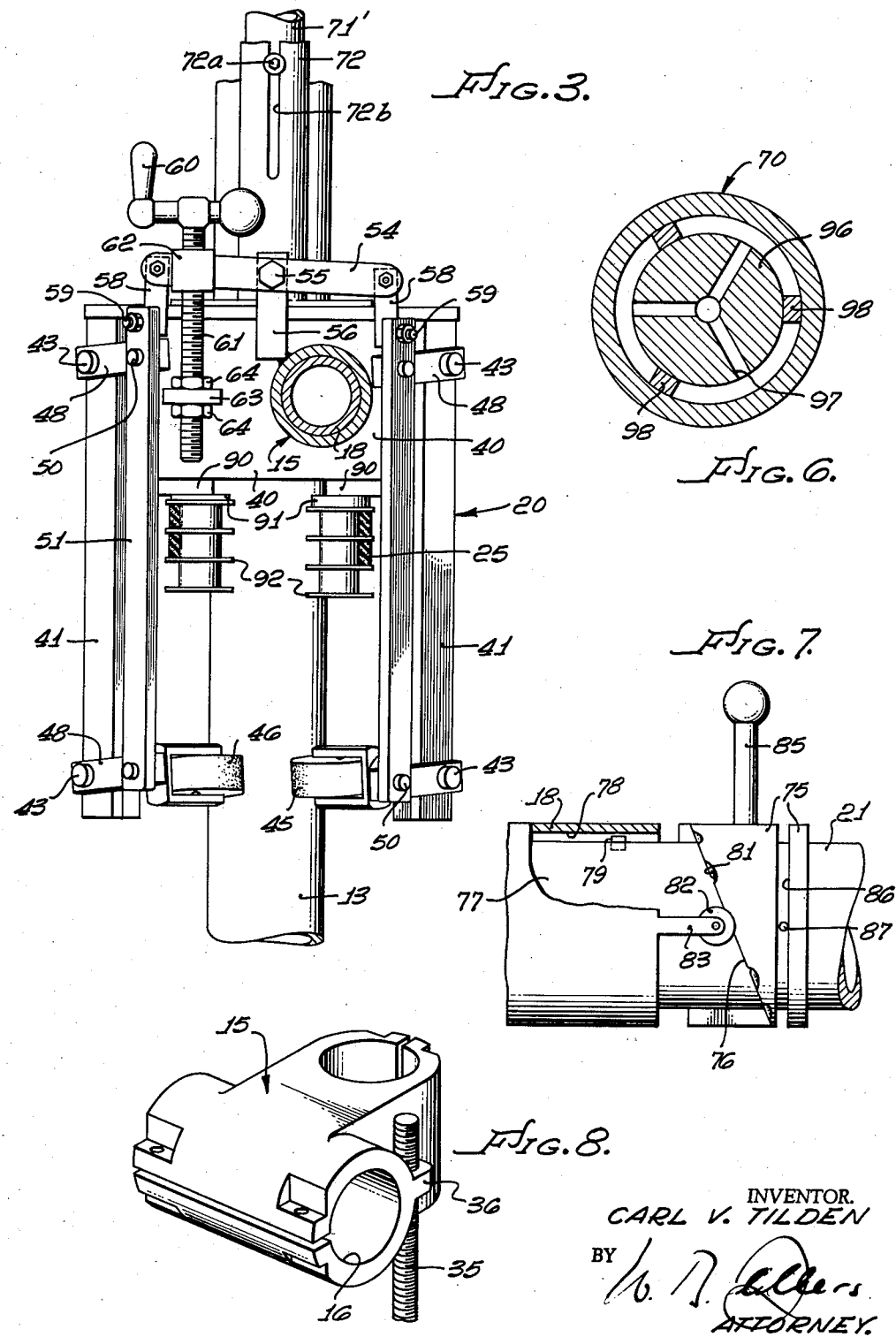

ated Mar. 17, 1964

United States Patent Office 3,125,172
PORTABLE DRILLING APPARATUS
Carl V. Tilden, Capistrano Beach, Calif.
(209 Los Molinos, San Clemente, Calif.)
Filed Sept. 8, 1959, Ser. No. 838,568
8 Claims. (Cl. 175—114)

This invention relates to drilling apparatus and more particularly to a portable power-driven unit featuring improved drill chucking facilities as well as unique means for regulating the feed rate and the pressure imposed on the surface being drilled.

There are in the prior art many drill constructions designed for convenience in moving them from place to place and adaptable for drilling in any desired direction. Drilling equipment of the type referred to are particularly well known in the rock drilling and mining arts. Despite the extensive design work and the many improvements which have been made in such equipment, much remains to be desired as respects weight reduction, flexibility of operation, adaptability to receive drill bits of widely varying sizes and especially apparatus having simple, rugged and easily operated means for varying the drilling rate and the pressure aplied to the surface undergoing drilling.

The foregoing and numerous other disadvantages of the prior constructions are obviated by the novel portable drilling apparatus provided by the present invention. For example, in a typical physical embodiment of the invention here disclosed by way of example, the main frame includes a vertical pedestal mounted on a wheeled base for ease in movement of the drill into the desired operating position. Slidably supported on the vertical pedestal is a universal junction coupling rotatably and slidably supporting in a transverse bore thereof a tubular bracket having secured to one outer end a unique drill chucking assembly. Telescopically mounted in the other end of the bracket tube is a reversible motor for driving one or more flexible belts embracing the drill shank and serving multiple purposes. These include frictionally engaging the shank of the drill to rotate it as well as to hold the drill firmly cradled in idler rollers of the chucking assembly. Other rollers engaging the runs of the belt closely adjacent the drill shank serve to cant the runs at an angle to the drill axis with the result that the belt is effective to raise or lower the drill depending on the direction in which the belt is driven by the motor.

Another important feature of the invention is the provision of simple crank means for canting the axis of the idling rollers relative to the drill axis and in a manner to control the rate and pressure of drill feed. The canting of the rollers together with the canting of the belt on the drill shank provides highly effective control over the advance of the drill with a nicety and precision not heretofore obtainable.

Chucking of the drill in its operating position is accomplished by manipulating a fast-action tensioning means for the driving belt whereby slackening of the belt releases the drill shank from pressure engagement with the chucking rollers. The drill may then be replaced with one of suitable size, the new drill being rechucked in operating position merely by operating the belt tensioning means to apply the desired tension to its runs.

Another feature of the invention is the confinement of the flushing fluid to a relatively small volume in contact with the interior side wall of the hollow drill tube thereby minimizing the quantity of flushing fluid and minimizing losses of flushing fluid from the open upper end of the drill bit due to centrifugal action.

Accordingly, it is a primary object of this invention to provide an improved power driven drilling apparatus characterized by its simplicity, flexibility, versatility and the ease with which it can be operated.

Another object of the invention is the provision of an improved portable drill featuring a novel drill chucking assembly and making use of the driving belt to hold the drill releasably in chucked position.

Another object of the invention is the provision of a simple control for the drill chucking assembly effective to vary the rate and pressure with which the drill is advanced into material being drilled.

Another object of the invention is the provision of a novel drilling apparatus featuring a drill chuck utilizing driving belt means for the drill to hold the drill shank cradled against appropriately disposed rollers and characterized by its facility to receive and drive drills of widely differing diameters.

Another object of the invention is the provision of a drilling apparatus utilizing belt means driven by a reversible motor which belt means is directly engageable with the drill shank to rotate the drill about its own axis as well as to move the drill axially of its axis at any of a large number of speeds dependent on adjustments made on the belt.

Another object of the invention is the provision of an improved core-type drill apparatus adapted to utilize a tubular drill bit having fixed to one end a cutting head and which drill is adapted to have the intermediate portion of its body held cradled against the idling rollers of a chucking assembly by means of a flexible driving belt.

Another object of the invention is the provision of a readily portable power driven apparatus adapted to chuck tubular core drills and featuring means for supplying flushing fluid to the shank end of the drill for flow to the cutting tip while substantially confined to the area adjacent the inner side wall of the drill.

These and other more specific objects will appear upon reading the following specification and claims and upon considering in connection therewith the attached drawings to which they relate.

Referring now to the drawings in which a preferred emobdiment of the invention is illustrated:

FIGURE 1 is a side elevational view of a typical embodiment of the invention, a drill bit being chucked in the apparatus and in readiness for use;

FIGURE 2 is a fragmentary end elevational view on an enlarged scale of the chucking assembly as viewed from the left hand side of FIGURE 1;

FIGURE 3 is a view similar to FIGURE 2 but taken along the vertical plane indicated at 3—3 on FIGURE 1;

FIGURES 4 and 5 are fragmentary cross-sectional views taken along lines 4—4 and 5—5, respectively, on FIGURE 1;

FIGURE 6 is a cross-sectional view on enlarged scale taken along line 6—6 on FIGURE 2;

FIGURE 7 is an enlarged fragmentary view, with parts broken away, of the manually operable belt tensioning device for the drill chucking assembly; and FIGURE 8 is a fragmentary perspective view of the universal coupling unit interconnecting the chuck supporting bracket and the main pedestal.

Referring now more particularly to FIGURE 1, the portable drilling apparatus designated generally 10 incorporating the present invention includes a main frame 11 mounted on suitable rollers 12, 12 and having a rigidly braced cylindrical pedestal 13 secured thereto. Slidably supported along pedestal 13 is a coupling 15 having a transverse bore 16 slidably seating and clamping a tubular bracket or arm 18 having rigidly secured to its outer end a chucking assembly 20. Telescopically assembled within the other end of the hollow bracket arm 18 is a tube 21 having fixed to its outer end a motor mounting plate 22. Clamped to plate 22 is a reversible electric motor 23 arranged to drive pulleys 24 supporting one or more flexible belts 25.

Main frame 11 of the drilling apparatus is preferably provided with suitable means for supporting rollers 12 off the ground and for anchoring the apparatus in a desired location while drilling. As here shown, such anchoring means comprises a plurality of screws 28 threadedly seated in threaded bores through frame 11 and effective when rotated downwardly to engage the floor and lift part or all of the weight of the apparatus off rollers 12. Further anchorage to hold the apparatus against movement while drilling is desirable wherever it is advantageous to apply considerable pressure to the cutting head. To this end the upper end of pedestal 13 has threadedly supported therein a screw 29 which passes through a threaded bore in a hand wheel 30. This wheel is held rotatably secured to pedestal 13 as by a grooved collar or the like engageable with a pin projecting inwardly from the upper end of the pedestal and so arranged as to hold the hand wheel against axial movement while leaving it free to rotate to shift screw 29 upwardly or downwardly.

The upper end of screw 29 is provided with a smooth walled head having a flange 32 at its base serving as a stop for a spacer tube 33 fitting loosely over the head. It will be understood that rotation of hand wheel 30 in one direction serves to shift screw 29 upwardly to press sleeve 33 against an overlying fixed support, as a ceiling, while pressing pedestal 13 and main frame 11 downwardly against the underlying floor. Rotation of wheel 30 in the opposite direction threads screw 29 into pedestal 13 thereby permitting spacer sleeve 33 to be removed.

The means for shifting universal coupling 15 vertically of pedestal 13 and for securing this coupling in any desired position includes a screw 35 having its lower end rotatably anchored in the base of main frame 11. The upper end of this screw passes through a threaded bore in a flange 36 (FIGURE 8) projecting from the main body of coupling 15, its upper end 37 being suitably formed to seat a wrench, hand wheel or other means for rotating the screw when it is desired to shift coupling 15 along pedestal 13.

Referring now more particularly to FIGURES 2 and 3, it will be seen that drill bit chucking assembly 20 is rigidly secured to the outer end of tube 18, as by a plate 40 welded to the end of tube 18. Rigidly welded to the outer ends of plate 40 and depending therefrom are a pair of heavy duty angle iron brackets 41, 41, the inner faces of which support pairs of journal sleeves 42 rotatably seating therein spindles 43. One end of these spindles is bifurcated to receive broad rimmed idling rollers 45 and 46.

As is best shown in FIGURES 3 and 5, the other ends of spindles 43 are held in assembled position in journal sleeves 42 secured to spindles 43 as by set screws 49. Pins 50 parallel to spindles 43 are fixed to the outer ends of arms 48 and are journalled in openings provided in operating links 51 lying parallel to stationary brackets 41, 41.

The upper ends of links 51 are pivotally connected to an operating linkage comprising a rock lever 54 fulcrumed about a bolt 55 supported by a bracket 56 rigidly carried by the chucking assembly. The opposite ends of rock lever 54 are connected to links 51 by means of links 58 and bolts 59.

The means for pivoting rock lever 54 about fulcrum 55 includes a hand wheel 60 fixed to the upper end of an adjusting screw 61 the threads of which mate with a threaded bore through a boss 62 formed on rock lever 54. Screw 61 is anchored against vertical movement by a bracket 63 fixed to plate 40 and having an opening therethrough freely passing screw 61. Nuts 64 preferably have a snug frictional fit with screw 61 and are disposed closely adjacent the opposite faces of bracket 63 thereby leaving the screw free to rotate while preventing it from shifting axially.

As will be evidenced from a consideration of FIGURE 3, the turning of hand wheel 60 is effective to shift the rock lever 54 in one direction or the other about fulcrum 55 depending on the direction of hand wheel rotation. For example, if the left hand end of lever 54, as viewed in FIGURE 3, is shifted upwardly then spindles 43 supporting the pair of associated rollers 46 are rotated counterclockwise about the axes of the spindles, whereas the spindles supporting the other pair of idler rollers 45, 45 are likewise rotated counterclockwise. However, owing to the fact that arms 48, 48 project toward one another from the axis of the associated spindles 43, it will be evident that the plane of one pair of rollers is canted in one direction whereas the plane of the opposite pair of rollers 46 is canted in the other direction relative to the axis of a drill shank cradled against the rims of the idler rollers 45, 46. The purposes and results of this differential canting of the two pairs of rollers will be explained more fully presently.

The drill tool per se 70 is here shown as comprising an elongated tube open at its opposite ends and having brazed or otherwise secured to its slightly enlarged end a plurality of cutting teeth 71, these being effective as the drill is rotated to cut an annulus in rock, concrete or other material being drilled in a manner well known to those skilled in core drilling. As here shown, drill tube 70 is of uniform diameter substantially throughout its length with the exception of its cutting rim end which is of slightly larger diameter to provide operating clearance and a passage for the cuttings. Drill tube 70 is held chucked in chucking assembly 20 by driving belts 25 encircling the shank portion of the tube along lines of contact preferably spaced intermediate the idler rollers 45, 46.

The means for tensioning the belt to hold the drill bit cradled within the chucking assembly comprises a sleeve 75 having a close rotating fit about tube 21 with its cammed end 76 facing toward end 77 of tube 18. Outer tube 18 may be provided lengthwise of its interior with an inwardly-opening groove 78 slidably seating a pin 79 projecting thereinto from tube 21. This arrangement permits tube 21 to shift axially of tube 18 without relative rotation. Sleeve 75 is provided with a radial slot 86 seating therein the outer end of a pin 87 projecting radially from tube 21, slot 86 extending partially around sleeve 75. Cammed end 76 of sleeve 75 is provided with notches 81 effective to seat a roller 82 mounted on a bracket 83 carried by the end of tube 18. Fixed to sleeve 75 is an operating lever 85 by which the operator can rotate the sleeve about tube 21. Rotation of lever 85 and sleeve 75 in one direction allows the tubes to telescope together thereby slacking belt 25, whereas rotation of sleeve 75 in the opposite direction acts through roller 82 and cam 76 to extend the tubes and tension belts 25, the parts being locked in a desired operating position by the seating of roller 82 in one of notches 81. As shown in FIGURE 7, roller 82 is engageable with the axially disposed opposite ends of cam 76 to limit rotation of sleeve 75 about tube 21.

Referring now more particularly to FIGURES 3 and 4, it will be seen that fixed to vertical brackets 41, 41 of chucking assembly 20 are clips 90 pivotally supporting brackets 91, 91 mounting idlers 92 for receiving belts 25. Bolts 93 can be tightened against arms 91 to lock the idler pulleys in a desired position relative to the runs of belts 25.

To be noted in particular from FIGURE 3 is the fact that arms 91 supporting the idler pulley may be, and preferably are, of different thicknesses with the result that idlers 92, 92 are supported in horizontal planes offset a desired amount from a plane passing therebetween and normal to the drill bit axis. The importance of this offset disposition of idlers 92 resides in the fact that this arrangement and the amount of the offset determines the angle of cant of the portions of belts 25 in direct contact with the periphery of drill shank 70 as is best made clear by FIGURE 2. Thus, assuming that the belts are being driven toward the left as viewed in FIGURE 2, it will be evident that the belts will be effective to shift drill 70 axially downward toward the surface being drilled. Contrariwise, if the belts are rotated in the opposite direction and toward the right as viewed in FIGURE 2, it will be understood that the belts will be effective to shift the drill bit upwardly away from the surface being drilled. The rate at which the drill is shifted axially at any given motor speed is dependent on the cant angle of the belts along their lines of contact with the drill shank which angle, as explained above, is determined by the difference in thickness of arms 91, 91 supporting idler rollers 92, 92.

Desirably, the chucking assembly includes an adjustable stop overying the upper end of the drill bit and effective in safeguarding against the drill bit being retracted so far as to be run out of engagement with the lower set of cradling rollers 45, 46. This stop includes an upright tubular socket 72 fixed to a plate welded to the upper edge of plate 40. Slidably supported in socket 72 is a tube 71' having secured to its upper end a rigid stop 73 overlying the upper end of drill bit 70. A locking cap screw 72a threaded into tube 71' is movable along a vertical slot 72b formed in socket 72 and permits tube 71' to be rigidly clamped in any desired position thereby accommodating the use of drill bits of widely different lengths. In other words, the distance to which the drill can be withdrawn is limited and determined by the adjustment of stop 73 above the top of chucking assembly 20.

Another significant feature of the invention, particularly when using core drills of larger diameters, is the provision of suitable filler means within the drill tube having as its purpose the confinement of the flushing fluid substantially to a small volume immediately adjacent the inner wall of the tube. This end may be accomplished by inserting within the drill tube a filler of lightweight material, such as non-porous plastic sponge material 100, having an outer diameter somewhat smaller than the inner diameter of the drill bit and having a length desirably one half or more than that of drill bit 70. Spacer bosses may be attached at spaced points along the filler to hold it generally centered in the tube. The buoyancy of filler 100 serves to hold the filler pressed against fitting 96 so long as the drill is flooded with flushing fluid as it is while in use. Water may be supplied to the upper end of the drill as by a tube 95 discharging into a fitting 96 seating loosely within the upper end of the tube in any suitable manner and having one or more distributing passages opening radially therethrough. If desired, fitting 96 may have a friction fit within spacer elements 98 disposed about the inner side wall of a drill tube. Or fitting 96 may fit loosely within spacers 98 and hold the buoyant material 100 depressed solely by reason of its weight.

The operation of the described drilling apparatus will be quite apparent from the foregoing description of its structural details. It will be understood that the apparatus can be employed to drill at any desired angle and direction by the simple expedient of properly orienting supporting base 11 for pedestal 13 and additionally by rotating tubes 18 and 21 within universal supporting bracket 15 to the desired position and then clamping cap screws 99 (FIGURE 1) to pull the upper and lower halves of bracket 15 snugly against the underlying surfaces of tube 18.

A drilling tool of the appropriate size and length required for the operation underway is mounted in chucking assembly 20 by first rotating handle 85 and sleeve 75 in a direction to slacken belts 25. After the proper drill bit 70 has been cradled against chucking rollers 45, 46, belt tensioning lever 85 is rotated in the opposite direction until roller 82 seats in the appropriate one of notches 81 to lock the belt 25 in properly tensioned position thereby firmly chucking the drill in place against supporting idlers 45, 46.

Handle 60 of the drill feed rate control device is then adjusted to cant the chucking rollers 45, 46 at the proper angle to advance the rotating drill bit at the desired rate against the surface being drilled. It is pointed out that increasing the cant angle of rollers 45, 46 increases the feed rate of the drill bit and also is effective to increase the pressure of the cutting elements of the drill on the surface being drilled.

During the drilling operation it will be understood that suitable flushing fluid, such as water, is desirably distributed into the top of the bit through supply pipe 95 and is fed downwardly along the inner wall of the drill to flush the cuttings upwardly about the exterior of the bit. If it is desired to inspect the bore at any time, the operator merely flicks the control switch for driving motor 23 to reverse its direction of rotation. This automatically acts to reverse the direction of movement of belts 25 thereby reversing the direction of rotation to propel the drill bit out of the hole. Return of the bit into drilling position is accomplished by again reversing the motor to the original direction of belt movement. Advancing the drill bit at a different rate is easily accomplished simply by changing the angle of cant of rollers 45, 46 by rotating hand crank 60 in the proper direction.

While the particular portable drilling apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A drill chucking assembly comprising a main support, means mounted thereon for supporting a plurality of groups of rollers, the rollers of each group having their axes in general alignment, means for canting the axes of the rollers of one group in the same direction but opposite to the angle of cant of the other group of rollers, said groups of rollers cooperating to engage and cradle therebetween the cylindrical shank of a drill, power-driven belt means embracing a drill shank and effective when tensioned to rotate the drill while simultaneously holding the same firmly cradled between said groups of rollers, belt tensioning means mounted on said assembly and operable to tension said belt means, and manually operable means to relax and later re-tension said belt means to permit removal and replacement of the drill with another drill having a shank of different diameter.

2. A drill chucking assembly as defined in claim 1 characterized in the provision of manually operable means for varying the angle of cant of said groups of rollers relative to one another thereby to vary the rate of advance of said drill against the material being drilled.

3. A drill chucking assembly as defined in claim 1 characterized in the provision of manually operable means including a single operating member for varying the angle of cant of said groups of rollers relative to one another thereby to vary the rate of drill advance and the effective drilling pressure against the material being drilled.

4. A power-driven drill chucking assembly comprising, a main frame, a plurality of rollers mounted in spaced apart parallel rows and cooperating to cradle a drill shank therebetween, and means for holding a drill cradled against the rims of said rollers comprising flexible power driven belt means adapted to embrace the drill shank with the runs thereof tensioned and in firm frictional engagement with the drill shank on the opposite side thereof from said rollers, belt tensioning means for holding the runs of said belt means under tension, and means for canting the axes of said rollers selectively at a desired angle to the axis of the drill whereby the rolling engagement of the drill shank with said rollers is effective to urge said drill to move axially toward and away from the material to be drilled with the direction of drill movement depending on the direction of roller tilt.

5. A drill chucking assembly as defined in claim 4 characterized in that said belt tensioning means includes hand operated camming means for quickly slackening or tensioning said belt means and effective to hold the belt means firmly tensioned while in use to rotate a drill.

6. A drill chucking assembly as defined in claim 4 characterized in that said drill tool is an open-ended tube having cutting means secured to one end rim thereof, and means for supplying a flushing fluid to the other end thereof and for confining said water substantially to a flow path immediately adjacent the inner side wall of the drill tool.

7. A drill chucking assembly as defined in claim 4 characterized in the provision of means for operating said belt means selectively in opposite directions one of which is effective to advance said drill against the work and the other of which is effective to retract the drill away from the work.

8. A drill chucking assembly as defined in claim 7 characterized in the provision of adjustable stop means positionable at different distances above the shank end of said drill and effective to limit the retraction of the bit when said belt means is operated in a drill retracting direction.

References Cited in the file of this patent

UNITED STATES PATENTS

| | | |
|---|---|---|
| 443,072 | Chapman | Dec. 16, 1890 |
| 492,536 | Brown | Feb. 28, 1893 |
| 528,608 | Richter | Nov. 6, 1894 |
| 2,084,686 | Howard | June 22, 1937 |
| 2,775,077 | Whittenberg | Dec. 25, 1956 |
| 2,837,938 | Spitzer | June 10, 1958 |
| 2,946,567 | Pepper | July 26, 1960 |